:::

United States Patent Office 2,801,967
Patented Aug. 6, 1957

2,801,967
DRILLING FLUID AND METHOD

Doyne L. Wilson, Pasadena, Calif., assignor to Oil Base, Inc., Compton, Calif., a corporation of California No Drawing. Application September 12, 1955,
Serial No. 533,917

6 Claims. (Cl. 252—8.5)

This invention relates to a drilling fluid and to a process for drilling wells. More specifically, the invention relates to drilling fluids of the type employed in the rotary method of drilling oil and gas wells, and pertains particularly to oil base drilling fluids.

The present invention has to do with the production of improved oil base drilling fluids, and also to the treatment of any such drilling fluids while in use to develop or improve certain properties, particularly to increase the viscosity and gel strength and to decrease fluid loss.

It is the general object of the present invention to produce drilling fluids and methods of treating fluids so as to improve the viscosity and gel strength of the drilling fluids. Oil base drilling fluids during use may undergo a reduction of viscosity and gel strength below acceptable minimums so that it becomes necessary to increase these characteristics within allowable limitations. In the case of such drilling fluids it has been customary to obtain the desired increase in viscosity and gel strength by either adding blown or natural asphalt or by adding naphthenic acid where the oil base drilling fluid contains calcium oxide or hydroxide. However, considerable time, temperature and agitation are required to get the solid particles of asphalt into solution before they become effective, while naphthenic acid is sometimes not as effective as it should be, particularly so when the oil base drilling fluid contains a large amount of weight material. There is at present a tendency to even deeper wells with corresponding higher gas pressures so that drilling fluids of heavy weight are required, which means a corresponding increase in the total solids in the drilling fluid. To accomplish this, an improved means for increasing the viscosity and gel strength of oil base drilling fluids is desired. I have discovered that the viscosity and gel strength of oil base drilling fluids may be increased and the weight material therein stabilized and dispersed by the addition of rubber latex, either natural, synthetic or reclaimed. By the addition of rubber latex to oil base drilling fluids, I have found it possible to provide oil base drilling fluids of satisfactory properties of heavier weight than heretofore in general use. Furthermore, I have discovered that the addition of latex is capable of correcting the viscosity and gel strength.

In addition to the value of latex in the production of oil base drilling fluids, or in the treatment of same during use, I have found that by the addition of latex to crude oil it is possible to produce usable lightweight drilling fluids. Normally crude oil by itself is not satisfactory as a drilling fluid because of the high fluid loss to the formation and because of low viscosity and low gel strength but by the addition of latex these shortcomings of crude oil as a drilling fluid are overcome.

One object of the present invention is, therefore, to provide an oil base drilling fluid of satisfactory viscosity and gel strength weighing in excess of 100 lbs. per cu. ft. and in which the weight material is properly stabilized and dispersed under severe operating conditions, particularly those involving high bottom hole temperatures.

In the process and product of the present invention it appears that any latex, natural, synthetic or reclaimed, may be employed. For example, latex of the Buna S type produced by the copolymerization of butadiene and styrene are suitable, including those commercially sold as GR-S rubber, Chemigum S. Likewise, Buna N latex produced by the copolymerization of butadiene and acrylonitrile is satisfactory, this rubber being on the market under the names Hycar, Perbunan, Chemigum N. Ameripol. Also Butyl rubber latex such as Flexon, GR-1, produced by the copolymerization of isobutylene and isoprene may be employed. Neoprene latex (GR-M) produced by the polymerization of chloroprene in latex form may be employed. Thiokol A type latex such as GR-P produced by the condensation of ethylene dichloride and sodium tetra-sulfide may be employed, and Thiokol B type latex produced by the condensation of dichloroethyl ether and sodium tetra-sulfide may be employed, as well as Vistanex latex produced by polymerization of isobutylene, and natural rubber latex such as derived from the Hevea tree.

In accordance with the present invention, any of the above rubber latex may be employed either in the original compounding of the drilling fluid to produce desirable viscosity, gel strength and fluid loss properties, or any of the rubber latex may be added to the drilling fluid during use. For example, if a drilling fluid discharging from a well has too low a viscosity, it is recommended that the latex be added in a small stream to the drilling fluid as it emerges from the well so as to pass with the drilling fluid through the vibrating shaker screen and on into the suction pit, whereby these operations will further the desired turbulence and secure proper mixing of the latex with the drilling fluid. It is, therefore, understood that suitable mixing is necessary before the latex can take effect, particularly in the case of the treatment of oil base drilling fluids or plain crude oil since latex is in the form of an aqueous dispersion insoluble in oil although easily dispersed therein by thorough agitation. As another example, the latex may be added to the drilling fluid at the time the latter is prepared, either in a premixed condition for transportation to the well or at the well from premixed or sacked material. Further, drilling fluid which is stored for some time prior to use and possesses insufficient gel strength to hold weight material in suspension may be treated with latex to provide the required gel strength to maintain the weight material in suspension.

The present invention and various further objects and advantages of the invention will be apparent from the following examples of the invention:

In the first example of the invention there was being employed under drilling an oil base drilling fluid which had a Marsh funnel viscosity of 150 seconds at 102° F. This oil base drilling fluid was known as "Black Magic"

and was composed substantially as described in the patent to George Miller, No. 2,356,776, containing an appreciable amount of asphalt. It was desired to increase the viscosity of the oil base drilling fluid in order to facilitate a gravel-packing operation. Accordingly, 1.5 drums (53 gallons net per drum) of GR-S type 4 latex were added to 300 bbls. of the oil base drilling fluid and the viscosity rose from 150 to 215 Marsh funnel seconds. GR-S type 4 liquid latex contains about approximately 40% solids and is a Buna S rubber. An additional 0.5 drum of the latex raised the viscosity to 330 seconds, which was the desired viscosity. Thus, it is apparent that the addition of 0.84% by volume of GR-S type 4 liquid latex to the particular oil base drilling fluid raised the viscosity from 150 Marsh funnel seconds to 330 seconds, an increase of 220%.

In the second example of the invention, there was being used in a well Black Magic oil base drilling fluid which had a Marsh funnel viscosity of 70 seconds due to crude oil contamination. One drum of GR-S liquid latex was added to 600 bbls. of oil base drilling fluid which raised the viscosity from 70 to 140 Marsh funnel seconds. Thus the addition of 0.21% of GR-S liquid latex to the particular oil base fluid in the above-identified system increased the viscosity 200%.

In the following examples the viscosity of the untreated and treated drilling fluids is determined by means of a Stormer viscosimeter in terms of the driving weight, in grams, required to turn the spindle 600 R. P. M. while immersed in the sample at a given temperature and expressed in centipoises.

In the following tabulation the results of laboratory experiments on the viscosity and fluid loss of fuel oil as effected by the addition of different quantities of natural rubber latex are tabulated. In each of the tests 350 cc. of crude oil were employed and in the tabulation there is indicated the amount and percentage by volume of natural rubber latex added in the different tests, as well as the viscosity, and fluid loss over a period of time. In the tabulation, the first two examples involve the use of a 26 API gravity crude oil from Fellows, California, one tested without any addition of natural rubber, the other by the addition of 10 grams of natural rubber latex containing 61.96% solids. In the other test the mixture was stirred for 15 minutes in a Waring blender, the product was subjected to viscosity measurements with a Stormer viscosimeter and fluid loss determined with a standard API mud filter press. The next four examples listed embody the use of a 30 gravity crude oil from Mirando, Texas, treated respectively with 0, 2, 4 and 6 grams of natural rubber latex in the different tests. The next four examples involved the use of a semi-refined #5 fuel oil (containing from 25-40% asphalt) from Ventura, California, treated respectively with 0, 2, 3 and 5 grams of natural rubber latex.

The process of the present invention is not only useful in connection with imparting desirable viscosity properties to an oil base drilling fluid but by means of the present invention it is possible to even exceed the viscosity and gel strength normally useful in drilling. In conjunction with a subsidence program conducted at Terminal Island, California, it was desirable to impart excessive viscosity and gel strength to an oil base drilling fluid. The following experiments indicate how this can be accomplished in accordance with the present invention. Experiments are tabulated below and each involve the use of 350 cc. of Black Magic oil base drilling fluid treated successively with 0, 10, 20, 30 and 40 grams of GR-S synthetic latex. In these tests, after standing 24 hours at room temperature, the consistency of the drilling fluids were tested by penetration of a standard grease cone using a 50 gram weight as rider.

| Oil Base Drilling Fluid | Vol., cc. | Synthetic latex GR-S, 40% solids | | Cone Penetration Scale Units at 68° F. |
|---|---|---|---|---|
| | | grams | Percent by vol. | |
| Black Magic | 350 | 0 | 0 | Too fluid to measure. |
| Do | 350 | 10 | 2.77 | 460 plus. |
| Do | 350 | 20 | 5.54 | 420. |
| Do | 350 | 30 | 8.31 | 374. |
| Do | 350 | 40 | 11.08 | 340. |

The untreated Black Magic oil base drilling fluid was an easily reversible thixotropic gel, while the treated Black Magic fluid became progressively more grease-like in consistency with increasing concentration of GR-S latex.

While in the foregoing examples a certain specific synthetic rubber latex and natural rubber latex were employed, in other experiments I have utilized all of the different aforementioned synthetic rubber latex and have employed them through the range of from 0.1% to 10% by volume of the drilling fluid, and in each case secured valuable increases in the viscosity and reduction in the fluid loss properties of the drilling fluid. Drilling fluids have been produced using crude oil ranging from 12 to 40° API gravity and rubber latex, either natural or synthetic.

It will be apparent from the above description and specific examples that the efficacy of rubber latex as an additive for increasing the viscosity and gel strength of oil base drilling fluids is dependent upon the presence in the fluid of an appreciable amount of asphaltic material. In the case of fluids wherein the oil base is crude oil or semi-refined oil, the asphaltic material is naturally present. In the case of the "Black Magic" fluid referred to, additional asphalt is present in the form of specific types of air blown asphalt and/or natural asphalt. The neces-

LATEX (NATURAL RUBBER)

[61.96% solids]

| Source | Type Oil | API Gravity | Vol., cc. | Grams (lbs./bbl.) | Percent by Volume | Viscosity at 30° C., cps. | Fluid Loss | |
|---|---|---|---|---|---|---|---|---|
| | | | | | | | cc. | Time |
| Fellows, Calif. | Crude | 26 | 350 | 0 | 0 | 10 | 100 | 0.5 min. |
| Do | do | 26 | 350 | 10 | 2.77 | 145 | 0.3 | 180 min. |
| Mirando, Texas | do | 30 | 350 | 0 | 0 | 12 | 95 | 0.5 min. |
| Do | do | 30 | 350 | 2 | 0.56 | 60 | 2.2 | 60 min. |
| Do | do | 30 | 350 | 4 | 1.12 | 94 | 1.9 | 60 min. |
| Do | do | 30 | 350 | 6 | 1.68 | 109 | 0.8 | 60 min. |
| Ventura Calif. | Fuel #5 | 19 | 350 | 0 | 0 | 210 | 25 | 24 hrs. |
| Do | do | 19 | 350 | 2 | 0.56 | 240 | 4.2 | 24 hrs. |
| Do | do | 19 | 350 | 3 | 0.84 | 265 | 0.8 | 24 hrs. |
| Do | do | 19 | 350 | 5 | 1.4 | 312 | 0.4 | 24 hrs. | sity for the presence of asphalt or asphaltic material is demonstrated by the following table:

| Sample | Oil | GR-S Latex (percent by volume) | Fann Tests at 100° F. | | | Fluid Loss, 100 p. s. i. | |
|---|---|---|---|---|---|---|---|
| | | | Viscosity (cps.) | Gel Strength (gms.) | | Time | cc. |
| | | | | 0' | 10' | | |
| 1 | Diesel | 0 | 6 | 0 | 0 | 3' | 100 |
| 2 | Diesel and Asphalt (12%) | 0 | 63.5 | 1 | 1 | 120' | 1.2 |
| 3 | Diesel | 0.6 | 6 | 0 | 0 | 3'15" | 100 |
| 4 | Diesel and Asphalt (12%) | 0.6 | 87.5 | 1 | 2 | 120' | 0.9 |
| 5 | Diesel | 1.2 | 6.5 | 0 | 0 | 4' | 100 |
| 6 | Diesel and Asphalt (12%) | 1.2 | 108 | 2 | 3 | 120' | 0.9 |
| 7 | Diesel | 2.2 | 7 | 0 | 0 | 7' | 100 |
| 8 | Diesel and Asphalt (12%) | 2.2 | 138.5 | 2 | 20 | 120' | 0.8 |

The diesel oil used in the tests reported in the above table was a commercially available oil containing no asphaltic components. From an inspection of the results set forth in connection with samples 1, 3, 5 and 7, it is apparent that the addition of varying amounts of latex alone has no significant effect upon the viscosity and gel strength of the fluid. Additionally, it can be noted from an inspection of these data regarding these samples that the fluids produced by the addition of varying amounts of latex to diesel oil containing no asphalt results in a fluid which would be of no value as a drilling fluid due to the extremely low viscosities and gel strengths, and the high fluid losses. On the other hand, from an inspection of the data with respect to samples 2, 4, 6 and 8, wherein the oil is a mixture of diesel fuel and 12% of an air-blown asphalt, it is apparent that the addition of varying amounts of latex causes a corresponding increase in both the viscosity and gel strength of the fluid, in proportion to the amount of latex added. It is to be noted that the latex, in addition to increasing viscosity and gel strength of asphalt-containing fluids, improves the fluid loss property of the fluid, in proportion to the amount of latex which is added.

Additionally, for the most effective utilization of the rubber latex, it is important that drilling fluid compositions, in accordance with this invention, be substantially free from coagulants or agents which would tend to increase the particle size of the dispersed rubber latex to a point where the colloidal rubber particles are no longer a uniform part of the fluid.

This application is a continuation-in-part of my co-pending application Serial No. 159,125, filed April 29, 1950, and now abandoned, for Drilling Fluid and Method of Producing Same, Doyne L. Wilson, inventor.

While the particular examples of the invention herein described are well adapted to carry out the objects of the invention, various modifications and changes may be made and this invention is of the scope set forth in the appended claims.

I claim:

1. An oil-base well-drilling fluid comprising an asphalt-containing petroleum oil, and at least about 0.1% by volume, based on the total volume of the drilling fluid, of rubber latex, said fluid being substantially free from a coagulant for said rubber latex and the asphalt being present in the petroleum oil in an amount sufficient with said rubber latex to substantially increase the fluid viscosity and gel strength of said drilling fluid and to substantially reduce fluid loss, the amount of rubber latex being insufficent to increase the viscosity of said drilling fluid to such an extent as to render said drilling fluid uncirculatable.

2. An oil-base well-drilling fluid comprising an asphalt-containing petroleum oil, and from about 0.1 to about 10% by volume, based on the total volume of the drilling fluid, of rubber latex, said fluid being substantially free from coagulant for said rubber latex and the asphalt being present in the petroleum oil in an amount sufficient with said rubber latex to substantially increase the fluid viscosity and gel strength of the drilling fluid and to substantially reduce fluid loss.

3. An oil-base well-drilling fluid as defined in claim 2 wherein said drilling fluid contains a substantial proportion of finely divided inert solids.

4. An oil-base well-drilling fluid comprising an asphalt-containing oil selected from the group consisting of asphalt-base crude oil and semi-refined petroleum oil derived from as asphalt-base crude, a substantial proportion of a weighting material, and from about 0.1 to about 10% by volume, based on the total volume of the drilling fluid, of rubber latex.

5. In a process for drilling a well with well-drilling tools wherein there is circulated in the well an oil-base drilling mud, the method of forming a mudsheath on the wall of said well to decrease the loss of fluid from said drilling mud contained therein into surrounding earthen formations, which comprises admixing with an asphalt-containing oil-base drilling mud and interacting therewith at least about 0.1% by volume, based on the total volume of the drilling mud, of rubber latex, the asphalt being present in said drilling mud in an amount sufficient with said rubber latex to lower the fluid loss through said mudsheath and the amount of rubber latex being insufficient to increase the viscosity of said drilling mud to such an extent as to render said drilling mud uncirculatable, and contacting said wall of said well with the resulting drilling mud to form said mudsheath thereon.

6. In a process for drilling a well with well-drilling tools wherein there is circulated in the well an oil-base drilling mud, the method of forming a mudsheath on the wall of said well to decrease the loss of fluid from said drilling mud contained therein into surrounding earthen formations, which comprises admixing with an asphalt-containing oil-base drilling mud and interacting therewith from about 0.1 to about 10% by volume, based on the total volume of the drilling mud, of rubber latex, the asphalt being present in said drilling mud in an amount sufficient with said rubber latex to lower the fluid loss through said mudsheath, and contacting said wall of said well with the resulting drilling mud to form said mudsheath thereon.

References Cited in the file of this patent

UNITED STATES PATENTS

| | | |
|---|---|---|
| 1,979,943 | Klemgard | Nov. 6, 1934 |
| 2,033,509 | Bowie | Mar. 10, 1936 |
| 2,390,450 | Morgan | Dec. 4, 1945 |
| 2,475,713 | Miller | July 12, 1949 |
| 2,481,339 | Penfield | Sept. 6, 1949 |
| 2,697,071 | Kennedy et al. | Dec. 14, 1954 |
| 2,743,233 | Fisher | Apr. 24, 1956 |

FOREIGN PATENTS

| | | |
|---|---|---|
| 343,548 | Great Britain | Feb. 16, 1931 |

OTHER REFERENCES

Rubber in pressure lubricants, article in the India Rubber World, January 1, 1927, p. 206.